(12) United States Patent
Pihlaja et al.

(10) Patent No.: US 8,216,429 B2
(45) Date of Patent: Jul. 10, 2012

(54) DETECTION OF DISTILLATION COLUMN FLOODING

(75) Inventors: Roger Kenneth Pihlaja, Spring Park, MN (US); John Philip Miller, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 408 days.

(21) Appl. No.: 12/486,076

(22) Filed: Jun. 17, 2009

(65) Prior Publication Data

US 2009/0314623 A1  Dec. 24, 2009

Related U.S. Application Data

(60) Provisional application No. 61/073,492, filed on Jun. 18, 2008.

(51) Int. Cl.
*B01D 3/42* (2006.01)

(52) U.S. Cl. ............... 202/160; 203/2; 203/DIG. 18; 700/270

(58) Field of Classification Search ............... 202/160; 203/2; 700/270
See application file for complete search history.

(56) References Cited

U.S. PATENT DOCUMENTS

| | | | |
|---|---|---|---|
| 2,386,778 A | 10/1945 | Claffey | |
| 2,816,858 A * | 12/1957 | Walker | 203/2 |
| 3,027,307 A * | 3/1962 | Stoffer et al. | 378/52 |
| 3,408,261 A * | 10/1968 | Johnson et al. | 202/160 |
| 3,739,196 A * | 6/1973 | Tavis | 327/334 |
| 3,985,623 A | 10/1976 | Morgan et al. | |
| 4,036,918 A | 7/1977 | Morgan et al. | |
| 4,302,229 A * | 11/1981 | Anderson | 62/628 |
| 4,368,058 A * | 1/1983 | Crowley et al. | 95/19 |
| 4,377,443 A | 3/1983 | Tuck et al. | |
| 4,502,921 A * | 3/1985 | Shinskey | 202/154 |
| 4,539,076 A | 9/1985 | Swain | |
| 4,581,900 A * | 4/1986 | Lowe et al. | 62/228.1 |
| 4,654,813 A | 3/1987 | Edlund et al. | |
| 5,668,322 A * | 9/1997 | Broden | 73/756 |
| 5,680,109 A | 10/1997 | Lowe et al. | |
| 5,784,538 A | 7/1998 | Dzyacky | |
| 6,654,697 B1 | 11/2003 | Eryurek et al. | |
| 6,904,386 B2 | 6/2005 | Mylaraswamy | |

(Continued)

FOREIGN PATENT DOCUMENTS

WO  WO 95-11418 A1  4/1995

(Continued)

OTHER PUBLICATIONS

Callicott, R., Carr, P., "Use of state variable active filters as differentiators, rate meters, and end-point locators", Analytical Chemistry, p. 1840-42, vol. 46 No. 12, ACS (c) 1974.*

(Continued)

*Primary Examiner* — Robert A Hopkins
(74) *Attorney, Agent, or Firm* — Kinney & Lange, P.A.

(57) ABSTRACT

A method comprises sensing a differential pressure signal, filtering the differential pressure signal, generating a flooding indicator as a function of the filtered differential pressure signal, and indicating the onset of flooding. The differential pressure signal is sensed along a distillation flow path. The filtered differential pressure signal is responsive to a phase inversion along the flow path, and the flooding indicator is responsive to an onset of a flooding condition, based on the phase inversion. The onset of the flooding condition is indicated based on a change in the flooding indicator.

28 Claims, 5 Drawing Sheets

U.S. PATENT DOCUMENTS

| | | | |
|---|---|---|---|
| 7,085,675 B2 * | 8/2006 | Wegerich | 702/181 |
| 7,288,169 B2 | 10/2007 | Yada et al. | |
| 2005/0252760 A1 | 11/2005 | Yada et al. | |
| 2008/0029381 A1 | 2/2008 | Dubettier et al. | |
| 2008/0208527 A1 * | 8/2008 | Kavaklioglu | 702/179 |

FOREIGN PATENT DOCUMENTS

| | | | |
|---|---|---|---|
| WO | WO2006107933 | * | 10/2006 |
| WO | WO2006107952 | * | 10/2006 |

OTHER PUBLICATIONS

"143DP Intelligent d/p Transmitter", Product Specification, Foxboro-Eckardt GmbH, pp. 1-2, Nov. 2005.*

Baker, C., de Nevers, N., "Bubble formation at vibrated orifices: medium-chamber-volume region". AlChe Journal, vol. 30, No. 1, pp. 37-43, Jan. 1984.*

Stockfleth, R., Brunner, G., "Holdup, pressure drop, and flooding in packed countercurrent columns for the gas extraction", Ind. Eng. Chem. Res., vol. 40, pp. 347-356, American Chemical Society (c) 2001.*

Matsumoto, S., Suzuki, M., "Statistical analysis of fluctuations of froth pressure on perforated plates without downcomers", International Journal of Mutliphase Flow, vol. 10 No. 2, pp. 217-228, (c) 1984 Elsevier.*

Cheremisinoff, Handbook of Chemical Processing Equipment, Butterworth-Heinemann, 2000, pp. 162-243.

Lieberman, Troubleshooting Process Operations, PennWell, 1991, pp. 256-280.

International Search Report and Written Opinion for PCT/US2009/047594.

Supplementary Search Report of the European Patent Office dated Mar. 5, 2012.

* cited by examiner

DETECTION OF DISTILLATION COLUMN FLOODING

CROSS-REFERENCE TO RELATED APPLICATIONS

This application claims benefit of the filing date of U.S. provisional Patent Application No. 61/073,492, filed Jun. 18, 2008.

BACKGROUND

This invention relates generally to fluid processing, and in particular to distillation processes for separating fluids of different volatility. In particular, the invention concerns detection of flooding conditions in a distillation column.

Distillation and related processes are used to separate components of a fluid mixture. Distillation is performed by heating the mixture to a boiling point, and extracting products with relatively higher or lower volatility based on differences in boiling temperature, condensation point, and vapor pressure.

Distillation equipment and techniques vary with application. In alcoholic beverage production and other processes, for example, the distillation apparatus is typically referred to a still. In a simple batch still, fermentation products such as mash are boiled in a single-pass process in order produce a distillate with mixed composition, including both water and alcohol as well as oils and other flavor components of the mash. The pressure, temperature and boiling rate are carefully controlled in order to regulate flavor and alcohol content.

In industrial techniques it is often necessary to more completely separate the final products, and the batch process is repeated a number of times based on the products' different boiling points and the desired level of purity. In continuous distillation, on the other hand, the fluid mixture or "feedstock" is constantly fed into a boiler to generate continuous vapor flow through the distillation column, with the more volatile distillate (or top product) being removed near the top of the column and the less volatile residue (or "bottoms") removed near the bottom.

In fractional distillation the heating vessel is typically described as a reboiler, and the distillation column is divided into a bottom stripper section and a top rectifier section, with a feedstock inlet between the stripper and the rectifier. The bottom product is continuously recycled through the stripper via the reboiler, in order to increase the heavy fraction of the bottoms. Similarly, the top product is continuously recycled through the rectifier section via a reflux drum, in order to increase the light fraction of the distillate. The striper and rectifier sections also typically include distillation trays or a packing material to provide increased surface area for condensation, reheating and vaporization. This increases mass transfer and throughput, improving efficiency and providing more refined, higher-purity top and bottom products.

In petroleum refining, the process feed (e.g., crude oil) often has multiple components, and large distillation columns (or distillation towers) are used to extract a variety of different products (or fractions) at different heights. In natural gas processing (or "sweetening") and emissions control applications, on the other hand, the goal is to remove unwanted impurities and the distillation column is often referred to as an absorption column or scrubber.

Distillation is also used in air separation and other cryogenic processes, for example to separate liquid oxygen, liquid nitrogen, and liquid argon, and for a variety of carbon dioxide-based processes. Other techniques include steam distillation for heat-sensitive and high-boiling point materials, and vacuum distillation for fluids that react with oxygen or nitrogen in the air, or are highly sensitive to environmental contaminants.

In each of these applications, safety and efficiency demand a high degree of process control. While the output rate is ultimately determined by thermal input, moreover, there is a constant tradeoff between heating rate and the risk of flooding. Flooding occurs when the vapor flow disrupts the condensation flow, causing axial mixing that reduces differentiation and decreases efficiency. When unchecked, flooding can also cause a runaway condition that disrupts the entire distillation process, resulting in product losses and system downtime. Thus there is a constant need for improved flooding detection and control techniques, particularly techniques that are adaptable to a range of different distillation systems and processes.

SUMMARY

This invention concerns a method for detecting flooding in a distillation column, and a system and apparatus for using the method. The method comprises sensing a differential pressure signal, filtering the signal, generating a flooding indicator, and indicating the onset of flooding. The differential pressure signal is sensed along a distillation flow path, and filtered as a function of frequency. The filtered differential pressure signal is responsive to a phase inversion along the flow path. The flooding indicator is generated as a function of the filtered differential pressure signal, and is responsive to the onset of a flooding condition based on the phase inversion. The onset of flooding is indicated based on a change in the flooding indicator.

DETAILED DESCRIPTION

Figure 1:
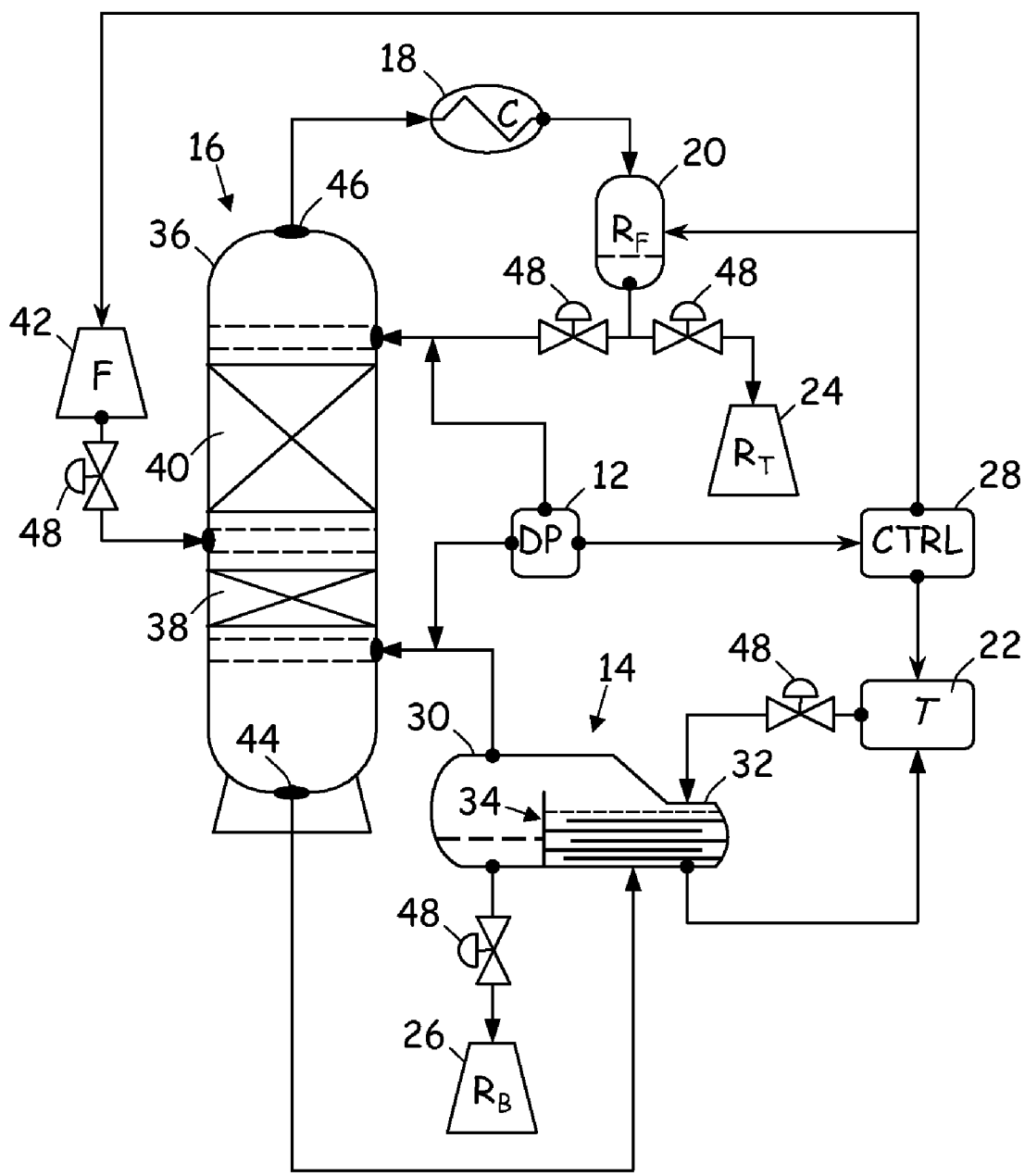
FIG. 1 is a cross-sectional view of a system with a differential pressure sensor for detecting flooding in a distillation column.

FIG. 1 is a cross-sectional view of distillation system 10 with differential pressure (DP) transmitter 12 for detecting column flooding. Distillation system 10 comprises DP transmitter 12, reboiler 14, distillation column 16, condenser 18, reflux drum 20, thermal source 22, receiver 24 for top products (condensate) and receptacle 26 for bottom products. Transmitter 12 generates a flooding indicator based on a differential pressure signal in distillation column 16, and controller 28 controls system 10 based on control input including the flooding indicator from transmitter 12.

DP transmitter 12 is field device or other measurement apparatus configured to sense differential pressure across a vertical height of distillation column 16 (that is, along the distillation vapor flow direction), and to transmit an output representative of the pressure to an operator or process controller. In some embodiments, for example, transmitter 12 is a two-wire transmitter configured to operate on a loop wire that provides both power and communications connections to transmitter 12.

In two-wire embodiments, communications are typically provided via an analog signal of about 4-20 mA, sometimes utilizing a hybrid analog/digital protocol such as HART®. Alternatively, communications employ a digital protocol such as FOUNDATION™ Fieldbus or PROFI® BUS or PROFI® NET, and utilize a variety of two-wire loops, cables, data buses and other hardware, including infrared (IR), optical, RF (radio-frequency) and other wireless means of communication. In some of these embodiments, transmitter 12 comprises a 3051-series or 3051S pressure transmitter, which is available from Rosemount Inc. of Chanhassen, Minn., an Emerson Process Management company. In other embodiments, the sensor configuration and communications protocol vary.

In the particular embodiment of FIG. 1, reboiler 14 comprises a steam-kettle type boiler having shell (or kettle) 30, heat exchanger 32 and overflow weir/retaining wall 34. Heat exchanger 32 comprises a steam tube bundle or similar means for transferring heat energy from thermal source 22 to the fluid in reboiler 14, with overflow weir 34 to maintain the fluid level over heat exchanger 32. In other embodiments, reboiler 14 utilizes a thermosyphon or forced recirculation design, and the configuration of kettle 30, heat exchanger 32 and weir 34 vary accordingly. Alternatively, reboiler 14 utilizes a fired boiler design, in which an electric furnace or gas-fired burner replaces one or both of thermal source 22 and heat exchanger 32.

Distillation column 16 is typically oriented in a vertical sense, with major elements housed within vessel wall 36. In the particular embodiment of FIG. 1, for example, column 16 includes stripping section (stripper) 38 and rectification section (rectifier, or enriching section) 40. Feed (or feedstock) 42 enters vessel wall 36 between stripper section 38 and rectifier section 40, bottom output 44 is located within or below stripper section 38, and top output 46 is located within or above rectifier section 40.

Stripper 38 and rectifier 40 are fluid processing regions in which mass transfer occurs between liquid and vapor phases of the feedstock components, or between feedstock components other processing fluids such as a sweetening solvent or scrubbing liquor. Mass transfer is enhanced by increasing the surface area in stripper 38 and rectifier 40, for example with a distillation tray (or plate) and downcomer configuration, or with a substantially continuous packing material. Packing materials are typically formed either from randomly oriented bodies having a high surface area to volume ratio, such as Raschig rings or Beryl saddles, or using a web, screen or sheet metal-based packing structure.

Condenser 18 comprises a heat exchanger for cooling vapor extracted from top output 46 of distillation column 16, producing a condensed distillate. Reflux drum ($R_F$) 20 comprises a pressure vessel for storing the distillate, which is either recirculated back to distillation column 16 as reflux, or extracted for output to receiver ($R_T$) 24. Bottom products ("bottoms") are extracted from excess liquid overflowing weir 34 in reboiler 14, and stored in bottom receptacle ($R_B$) 26.

As shown in FIG. 1, distillation system 10 typically operates in a steady-state or continuous mode. Feedstock 42 is fed into distillation column 16 through vessel wall 36, between stripper 38 and rectifier 40. Reboiler fluid circulates through bottom output 44 and reboiler kettle 30. Thermal source 22 and heat exchanger/furnace 32 heat the reboiler fluid to generate a flow of hot vapor upwards through stripper 38 and rectifier 40, inside distillation vessel wall 36. The feed, reboiler flow and heating rates (and other flow rates in system 10) are controlled by a number of valves 48.

Inside distillation column 16, there is a two-phase counter-current flow. Reboiler vapor flows upward through stripper 38 and rectifier 40 toward top outlet 46, and condensed liquids flow downward toward bottom outlet 44. More volatile (lighter, lower boiling temperature) components of the vapor are enriched along the upward vapor flow path. Separation is increased via reflux flow circulation through condenser 18, reflux drum 20 and rectifier 40, and the purified distillate is extracted into top product receiver 24. Less volatile (heavier, higher boiling temperature) components are enriched along the downward liquid flow path. Separation is increased via reboiler flow circulation through heat exchanger 32 and reboiler shell kettle 30, and the bottom product is extracted to bottoms receptacle 26.

When a complex feedstock 42 such as crude oil is used, additional outlets are sometimes located between bottom outlet 42 and top outlet 44 to extract products of intermediate volatility, for example groups having different aliphatic hydrocarbon content (or chain length), such as naphtha, gasoline, kerosene, diesel fuels, lubricating oils, paraffin, tar and bitumen. Alternatively, distillation system 10 operates in batch mode, and products of different volatility are removed at different times, or system 10 operates in a combination of continuous and batch modes. In further embodiments, system 10 comprises a scrubber, an absorption column or a related device, and performs another function such as emissions control or sweetening.

Distillation efficiency, throughput and reliability all make operational demands on distillation system 10, which must be balanced with cost concerns and safety considerations. This requires continuous oversight by an operator or control system such as process controller 28, which maintains a constant balance between thermal input and feedstock flow rate, and, depending upon the particular configuration of system 10, among various reflux, reboiler, absorption, adsorption and related flow loops. In particular, controller 28 controls the mass transfer rates in stripper 38, rectifier 40 and other two-phase flow elements, in order to encourage condensation and separation without undesirable entrainment of liquid in the vapor flow, and without causing bubble formation, foaming and flooding inside vessel wall 36.

Figure 2A:
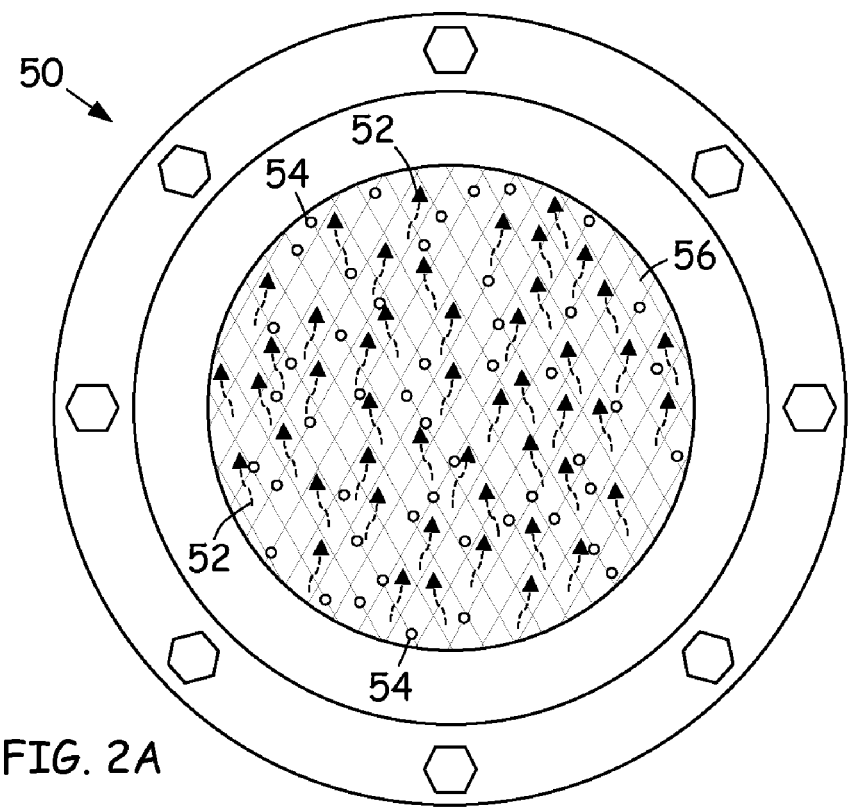
FIG. 2A is a schematic illustration of mass transfer processes in a vessel with two-phase counter-current flow.

FIG. 2A is a schematic illustration of mass transfer processes inside a two-phase counter-current flow vessel such as distillation column 16 of FIG. 1, above. In particular, FIG. 2A is an internal view of the reactor vessel taken through pressure port 50, showing the upward flow of continuous vapor phase 52 (dashed arrows) and the downward (counter-current) flow of liquid phase 54 (solid ovals). Liquid phase 54 condenses on packing materials 56, which in this embodiment take the form of a continuous structure such as a mesh or screen.

As shown in FIG. 2A, vapor phase 52 is a continuous phase, interspersed by regions (droplets) of discontinuous liquid phase 54. That is, vapor phase 52 occupies the void spaces between packing materials 56, and the upward flow path of vapor phase 52 through packing materials 56 is tortuous but unbroken. Conversely, the downward flow path of liquid phase 54 is broken into distinct droplets, streams or "drips," which are separated by regions of continuous vapor phase 52.

As vapor phase 52 travels upward along the distillation flow path, heavier components tend to condense on packing material 56. This generates mass transfer into droplets or streams of discontinuous liquid phase 54, increasing the heavier fraction of liquid phase 54 and decreasing the heavier fraction of vapor phase 52. Condensation also releases energy into liquid phase 54, encouraging the vaporization of the more volatile components. This generates mass transfer of lighter components from discontinuous liquid phase 54 into continuous vapor phase 52, decreasing the lighter fraction of liquid phase 54 and increasing the lighter fraction of vapor phase 52.

Packing materials 56 encourage mixing between the two phases. In efficient distillation (and other effective two-phase counter-current flows), however, the mixing is primarily radial (i.e., substantially horizontal), and not axial (i.e., not vertical). Thus the light fraction of vapor phase 52 continues to increase as it rises up the column, until it is ultimately extracted as a relatively volatile top product. Conversely, the heavy fraction of liquid phase 54 continues to increase as it propagates or flows down the column, until it is extracted as a relatively less volatile bottom product.

The upward flow of continuous vapor phase 52 also creates aerodynamic drag on discontinuous liquid phase 54. Increased throughput, moreover, requires increased flow, leading to increased drag. This slows the downward flow of liquid phase 54, leading to axial mixing and reducing distillation efficiency. In particular, when the aerodynamic drag balances the force of gravity, the downward flow ceases and liquid phase 54 becomes entrained in the upward flow of vapor phase 52. The continuous vapor and discontinuous liquid phases can then invert, such that liquid phase 54 occupies the void spaces between packing materials 56 and the vapor flow path is no longer continuous. This phase inversion thus indicates the onset of flooding in the two-phase flow.

Figure 2B:
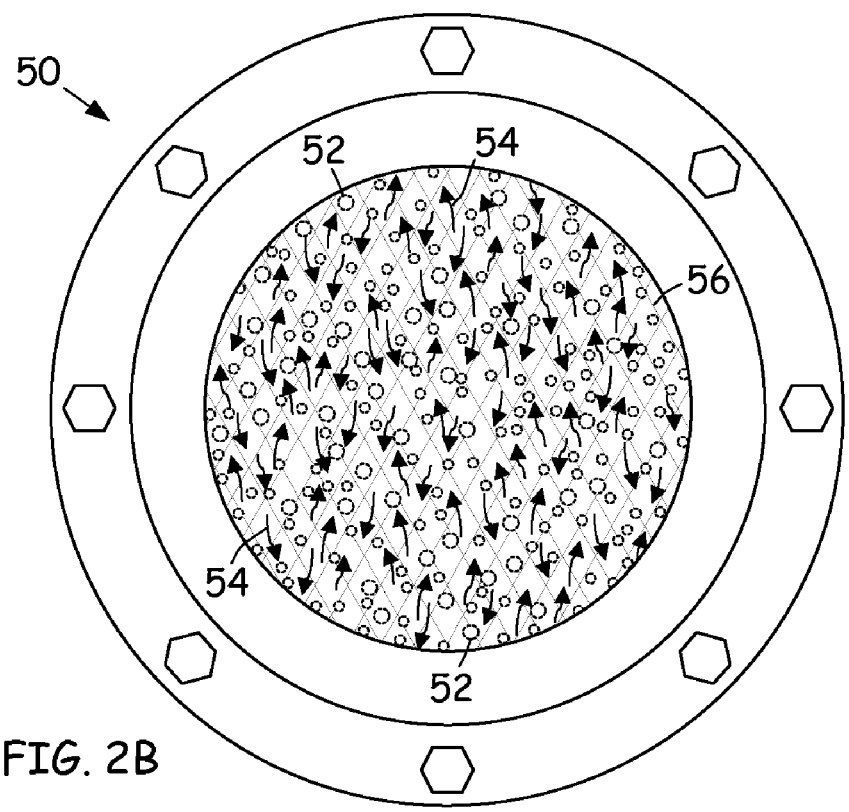
FIG. 2B is a schematic illustration of flooding in the vessel of FIG. 2A.

FIG. 2B is a schematic illustration of flooding in the two-phase counter-current flow vessel of FIG. 2A. FIG. 2B shows the result of a phase inversion in which liquid phase 54 (now shown with solid arrows) has become the continuous phase, interspersed by discrete regions of vapor phase 52 (now shown as dashed ovals or bubbles). Vapor phase 52 is now the discontinuous phase, with discrete regions (bubbles) of vapor phase 52 separated by continuous liquid phase 54.

As shown in FIG. 2B, flooding is a turbulent process in which the overall downward flow of liquid phase 54 is replaced by small-scale (localized) and randomized upward, downward and radial flow regions. In addition, liquid phase 54 becomes the continuous phase, and is no longer limited to the surfaces of packing material 56 but extends to fill the void spaces in between.

The result is the formation of a frothy liquid/vapor mixture or "foam." On average, bubbles of (non discontinuous) vapor phase 52 continue to rise, supporting continuous liquid phase 54 against the force of gravity, but the motion of individual bubbles is also more random and chaotic than in the non-flooding condition of FIG. 2A.

Phase inversion, bubble formation, foaming and flooding depend upon a number of factors including liquid and vapor flow rates, thermal energy input, boiling temperatures, vapor pressures, and the pressure head inside the vessel. Because these variables depend upon column height, localized flooding can occur at particular locations within the column, independently of the flow conditions at other column heights. In particular, flooding sometimes occurs only in particular regions of the stripper or the rectifier, and sometimes spreads across both sections at the same time.

In regions where flooding occurs, there is axial mixing of the two-phase flows. The vertical temperature gradient decreases, and separation efficiency is reduced such that the light and heavy fractions of vapor phase 52 and liquid phase 54 depend less strongly on column height. It is also possible for conditions to exist such that the critical point is exceeded, and there is no clear distinction between the liquid and vapor phases (that is, the fluid becomes supercritical).

When flooding is extensive, the compositions of the top and bottom products converge on that of the feed stream, substantially reducing distillation efficiency. In runaway flooding, radial mixing occurs along substantially portions of the vertical column height, where separation ceases and the distillation process essentially shuts down.

System 10 of FIG. 1 is designed to detect the onset of flooding activity before this occurs, and, in some embodiments, to provide means for controlling the distillation process in order to prevent runaway flooding. This is accomplished by filtering and processing a differential pressure signal sampled along the height of the distillation column (or other two-phase processing vessel), and indicating the onset of a flooding condition based on the output, as shown in FIGS. 3 and 4.

Figure 3:
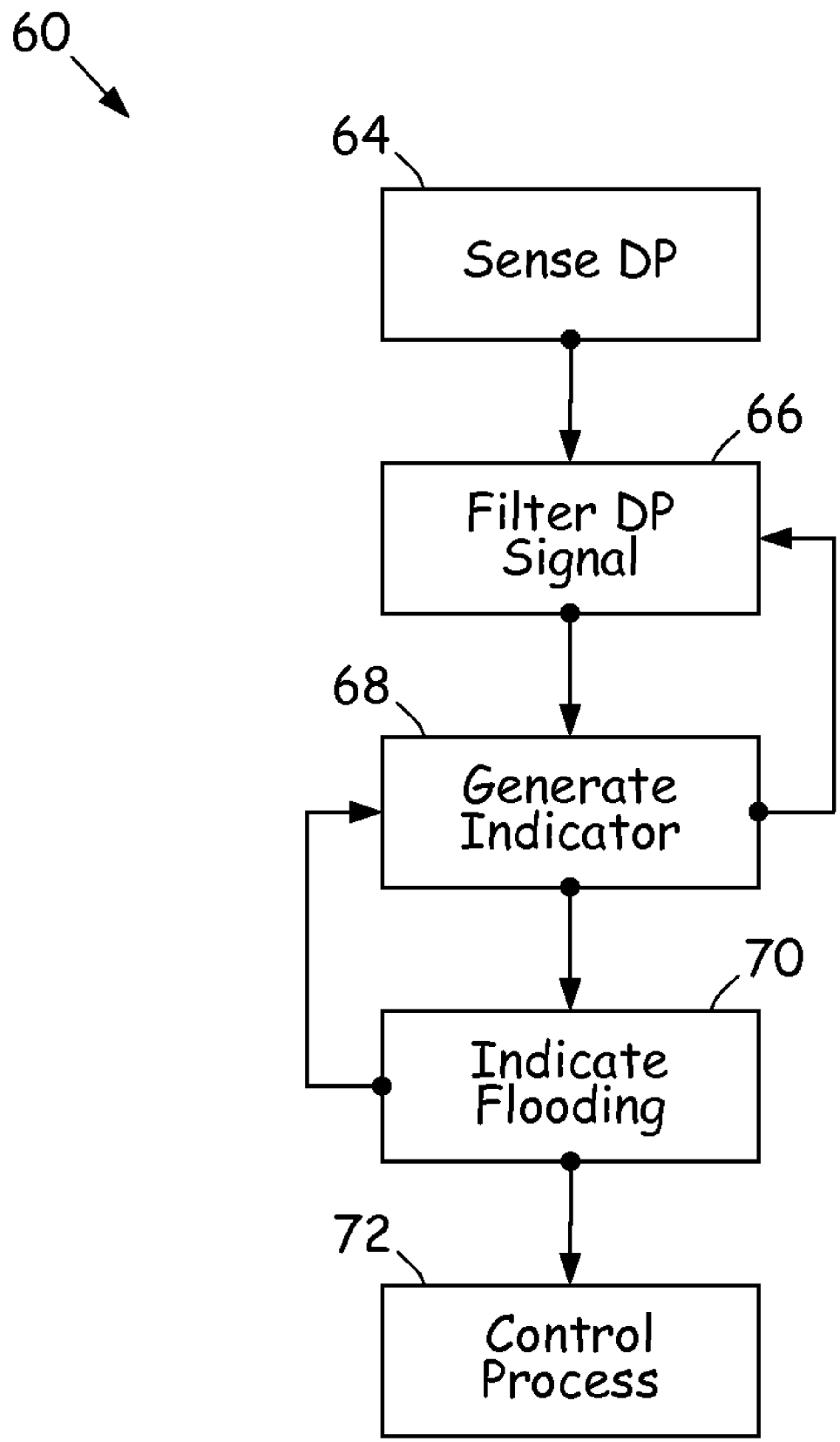
FIG. 3 is a schematic diagram of a method for indicating the onset of flooding in a two-phase counter-current flow, for example as shown in FIG. 2B.
Figure 4:
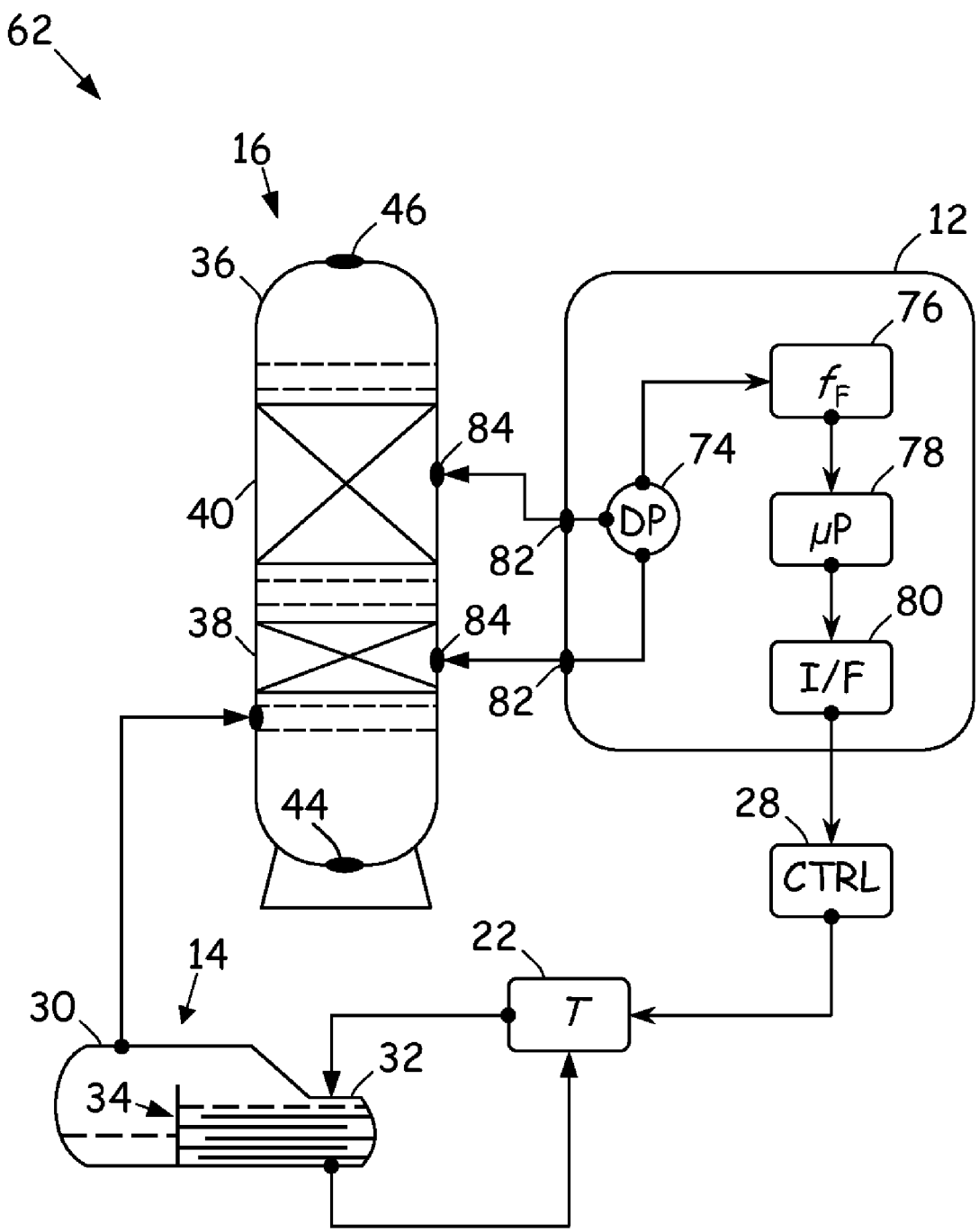
FIG. 4 is a schematic diagram of a system for performing the method illustrated in FIG. 3.

FIG. 3 is a schematic diagram of method 60 for detecting flooding conditions in a two-phase flow, for example the two-phase counter-current flows of FIGS. 2A and 2B. FIG. 4 is a schematic diagram of system 62 for performing method 60 of FIG. 3.

Method 60 (FIG. 3) comprises sensing a differential pressure (step 64), filtering the differential pressure signal (step 66), generating a flooding indicator (step 68), and indicating a flooding condition, based on the indicator (step 70). In some embodiments, method 60 further comprises controlling the distillation or other two-phase flow process (step 72), based on the flooding indicator generated in step 68.

System 62 (FIG. 4) for performing method 60 comprises distillation column 16, differential pressure sensor 74, frequency filter 76, processor 78 and indicator or interface 80. In some embodiments, differential pressure sensor 74, frequency filter 76, processor 78 and indicator 80 are comprised within transmitter 12, and in other embodiments these components are discrete. In additional embodiments, system 62 comprises controller 28 for controlling the operation of distillation column 16, based on the flooding indicator generated by indicator/interface 80.

Flooding is not a discrete on/off process, but tends to begin in a particular region (that is, at a particular vertical height) of the distillation column, and then spread to other locations. The early stages of flooding are also difficult to detect because they involve continuous phase changes, nonlinear flows, and complex thermodynamic effects. Sensitivity to flooding is also affected by changes in other process variables, such as feedstock composition, temperature gradients and pressure drops, and by the use of control systems to regulate the feed rate, reboiler duty and reflux ratio.

In order for method 60 and system 62 to effectively detect flooding conditions, these effects must be considered for a number of different distillation, scrubbing and absorption systems, and over a range of different operating conditions. In particular, method 60 and system 62 utilize differential pressure signals that are sensitive to bubble formation and collapse, foaming and other physical phenomena related to the onset of localized flooding, and generate flooding indicators that are responsive to the degree of that flooding, as characterized by liquid entrainment in the vapor flow and the transition (or inversion) between continuous and discontinuous vapor and liquid (or supercritical fluid) phases.

Sensing differential pressure (step 64) is accomplished by a differential pressure sensor such DP sensor 74. Sensor 74 is positioned to sense differential pressure across a particular vertical height of distillation column 16. In general, sensor 74 is connected across an arbitrary vertical height of packing material in one or both of stripper 38 or rectifier 40, providing sensitivity to the onset of flooding conditions in any particular location along the two-phase counter-current flow within vessel wall 36.

Pressure connections are typically accomplished using DP ports 82 in the housing of transmitter 12, using impulse tubing to connect to pressure ports 84 in vessel wall 36 as shown in FIG. 4. Alternatively, sensor 74 is positioned to sense differential pressure across existing fluid connections, for example across the reflux and reboiler connections, as shown in FIG. 1, or using any of a reboiler connection, a reflux connection, a feed inlet, bottom outlet 44, top outlet 46, or an intermediate inlet or outlet located anywhere along vessel wall 36.

Filtering the differential pressure signal (step 66) comprises applying a frequency-dependent filter to the differential pressure signal, for example using frequency filter ($f_F$) 76. Generating a flooding indicator (step 68) comprises generating the indicator as a function of the filtered differential pressure signal, for example using microprocessor ($\mu P$) 78. As described below with respect to FIG. 5, the particular frequency filter and indicator functions utilized depend upon a number of factors including the physical configuration of distillation column 16, the operating conditions within vessel wall 36, and the frequency response of differential pressure sensor 74.

Indicating a flooding condition (step 70) comprises transmitting or communicating an output signal to an operator or distillation control system, for example by using interface (I/F) 80 to communicate with process controller 28. In some embodiments, indicating the flooding condition comprises outputting or transmitting the flooding indicator itself. In other embodiments, method 60 and system 62 output a flooding alarm or other signal that is based on the flooding indicator, or on a change therein. The alarm signal also takes a number of forms, including binary (two-state) outputs, analog and digital functions that scale with the flooding indicator, audio and visual signals, and combinations thereof.

Controlling distillation (step 72) comprises controlling one or more operational parameters of distillation column 16, usually based on the output signal from step 70. In some embodiments, for example, system 62 utilizes process controller 28 to decrease the heat input to reboiler 14 by controlling thermal source 22 and heat exchanger/burner 32, in order to reduce vapor flow through distillation column 16 in response to the onset of a flooding condition.

Alternatively, system 62 increases the vapor flow rate, for example in response an output signal that indicates the absence of flooding. In further embodiments, system 62 utilizes any combination of controller 28, thermal source 22, heat exchanger/burner 32 and various valves 48 in order to control one or more of the feed, reboiler, reflux, bottoms, or distillate flow paths for distillation column 16, or to control a more generalized two-phase fluid processing system such as a scrubber, absorber, adsorber or natural gas sweetener.

In some embodiments, sensor 74, frequency filter 76, processor 78 and interface 80 are comprised within transmitter 12, for example a two-wire or wireless transmitter as described above with respect to FIG. 1. In these embodiments, filtering the differential pressure signal (step 66) and generating the flooding indicator (step 68) are sometimes accomplished by statistical filter or related processor components such as an abnormal situation prevention (ASP) block or a statistical process monitoring (SPM) block.

Alternatively, one or more of frequency filter 76, processor 78 and interface 80 are comprised within controller 28 or another distinct device, which performs one or more of the functions of filtering the differential pressure signal (step 66), generating the flooding indicator (step 68), or indicating the flooding condition (step 70). In further embodiments, additional data acquisition or data processing devices such as a Fieldbus Foundation™ PCMCIA card are used for frequency analyses and other calibration studies, and the frequency filtering and flooding indicator functions are based on the calibration.

Figure 5:
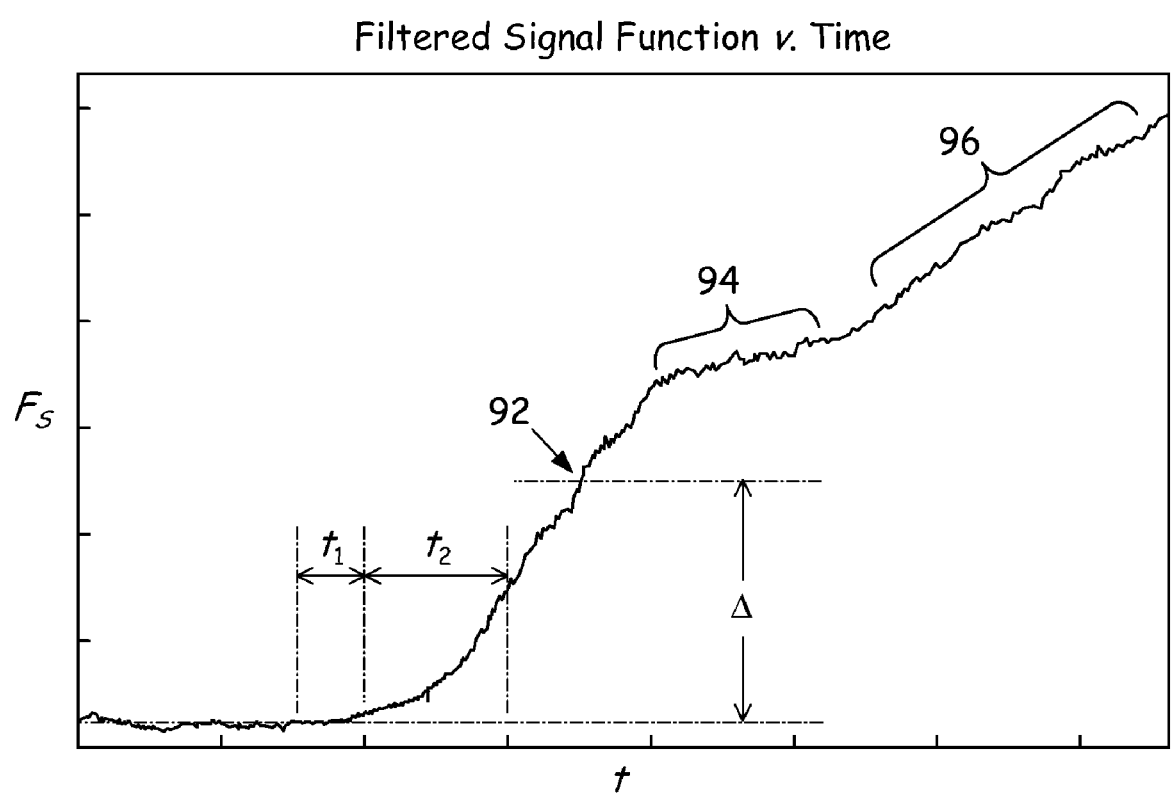
FIG. 5 is a plot of a flooding indicator versus time, illustrating the onset of a flooding condition.

FIG. 5 is a plot of flooding indicator (filtered indicator function $F_S$) versus time (t), illustrating the onset of a particular flooding condition. Flooding indicator $F_S$ is scaled on the vertical axis and time t is scaled on the horizontal axis, with both in arbitrary units.

Flooding indicator (or flooding signal) $F_S$ is responsive to phase inversion, bubble formation, bubble collapse, foaming and other flooding-related effects via a differential pressure sampled across a vertical flow path, as described above. In particular, the DP signal is sensitive to both broad-spectrum (or white noise) signals having a relatively flat power spectrum above a particular low-frequency threshold, and to narrow-band signals located between particular low-frequency and high-frequency limits.

The frequency response of the DP signal depends on the sampling rate and associated analysis parameters, including the Nyquist frequency. In general, the Nyquist frequency is greater than the frequency of bubble formation, bubble collapse and other pressure signals, in order to provide sensitivity to a wide range of flooding-related effects. In particular, the Nyquist frequency provides sensitivity to local inversions of the two-phase flow, including local foaming and entrainment effects, allowing an appropriate flooding indicator to be generated before runaway conditions occur.

In embodiments utilizing a Rosemount 3051S pressure transmitter, for example, the sampling rate ranges up to about 22.2 Hz or greater. This corresponds to a sampling period of about 45 ms or less, and a Nyquist frequency of about 11.1 Hz or more. In this range, differential pressure signals above about 11.1 Hz are aliased to lower frequency, while frequencies below about 11.1 Hz (below the Nyquist frequency) are not aliased. Alternatively, the sampling rate is about 10 Hz or higher, which corresponds to a sampling period of about 100 ms or less and a Nyquist frequency of about 5 Hz or greater. In further embodiments, the sampling rate is about 2 Hz or higher, corresponding to a sampling period of about 500 Ms or less and a Nyquist frequency of about 1 Hz or greater.

The appropriate frequency filter and flooding indicator function depend upon the frequency sensitivity of the DP signal and the response time of the distillation system or other two-phase fluid process. In particular, these functions depend upon the time scales for the onset of flooding and the transition from localized flooding to runaway flooding, and the time lag between particular control inputs and the resulting change in the differential pressure signal across a particular flow column height.

Processing configurations also play a role. In one embodiment, for example, the distillation column of FIG. 1 is run in full reflux mode; that is, there is no top product output from the reflux drum, and all the distillate is recycled back to the rectifier. In addition, the feedstock input is shut off and no bottom product is removed from the reboiler, creating a closed flow system. In this configuration, flooding is primarily dependent upon the reboiler duty cycle; so the reboiler duty can be increased until flooding is observed, and the process can be repeated any number of times in order to calibrate the frequency filter and flooding indicator functions.

In one such set of full-reflux tests, the lower-frequency power spectrum of the differential pressure signal (that is, below about 2 Hz), is not substantially sensitive to the onset of flooding. In the higher-frequency range, however (above about 4 Hz), there is an increase of nearly 10 dB in the power spectrum between the onset of flooding and a runaway flooding condition. In this case, a simple high-pass filter is used, where the low-frequency cutoff is between about 2 Hz and about 4 Hz. In general, however, the cutoff frequency depends upon operating conditions, and ranges from about 1 Hz and about 10 Hz.

Alternatively, a difference filter is used, such as:

$$f_i = \frac{p_i - p_{i-1}}{2}, \quad [1]$$

where $f_i$ is the filter output, and is half the difference between two successive pressure samples $p_i$ and $p_{i-1}$. Difference filters (alternatively, "differencing filters") tend to emphasize noise and other higher-frequency components, which are associated with entrainment, phase changes, bubble formation and other flooding indicators, while suppressing lower-frequency signals such as transients or slow changes in the overall differential pressure, which are sensitive to other operating conditions.

The difference filter is a more gradual filtering function than a simple low-frequency cutoff, and the effects are relative to the sampling rate, rather than an absolute cutoff or other a priori parameter. More complex filtering schemes are also employed, including finite impulse response (FIR) filters, infinite impulse response (IIR) filters, and Parks-McClellan or Remez exchange-based algorithms.

The flooding indicator function is based on the filtered differential pressure signal $f_i$, and also varies from embodiment to embodiment. Generically, the indicator function is given by:

$$F_S = F(f_i), \quad [2]$$

where indicator function $F_S$ is defined over a particular set (or sampling window) S of filtered differential pressure signals $f_i$. In one particular embodiment, for example, indicator function $F_S$ is a statistical measure such as a standard deviation, a mean square root, a variation, a skewness or a kurtosis. Alternatively, indicator function $F_S$ is also a function of an absolute pressure (AP) signal, including ratios of a differential pressure DP to absolute pressure AP, and statistical functions of such ratios. In these embodiments, the corresponding AP signal is typically extracted from one of the two separate DP ports, or is independently measured at another location along the two-phase flow.

Sample set S is typically defined over a "rolling" time window, for example one, two, three, four, five or ten minutes of real or actual operating time. Alternatively, sample set S is defined as a particular number of samples, and the time window depends upon the sampling rate. In general, longer (or wider) time windows generate "smoother" signal functions, but are less responsive. Shorter (or narrower) time windows provide faster response, but generate noisier signal functions.

The onset of a particular flooding condition is indicated by a change in indicator function $F_S$. In one embodiment, for example, the onset of a flooding condition is indicated when threshold function $F_S$ crosses threshold value $\Delta$, which is compared to a baseline or average nominal value as shown in FIG. 5. The appropriate threshold value, in turn, depends upon a number of considerations, including dead time $t_1$, time constant (or rise time) $t_2$ and the relative gain of the signal function.

Dead time $t_1$ corresponds to the response time of indicator function $F_S$ after a particular control parameter related to flooding is changed. The dead time includes both physical (or hardware) effects, such as the time lag between a change in reboiler duty or reflux ratio and the corresponding change in pressure across a particular DP sensor, and non-physical (software and analysis effects), such as the frequency filter and sampling window used to generate the indicator function. As shown in FIG. 5, moreover, dead time $t_1$ is typically not an absolute lag, but is instead defined as the time required for signal function $F_S$ to differ from the baseline level by a significant amount, typically a few percent absolute, or based on some fraction or multiple of the baseline noise level.

Rise time $t_2$ is the characteristic time constant of the change (increase or decrease) in signal function $F_S$. Typically the rise time assumes an exponential form, for example the time required for signal function $F_S$ to increase by a factor of two, ten, or e (the base of the natural logarithm).

The relative gain is simply the relative size of threshold $\Delta$, as compared to the change in a corresponding input or control parameter. The relative gain is typically scaled such that the change in signal function $F_S$ is large, as compared to the baseline value and background noise. In one particular embodiment, for example, the onset of flooding is triggered by a change in boiler duty of about five or ten percent, and the relative gain of signal function $F_S$ is selected so that threshold $\Delta$ is at least several times the nominal baseline or background noise value, as shown in FIG. 5. Note that the relative gain distinguishes from the absolute gain, which depends upon the units in which the signals are measured.

Gain selection allows for precision control of unstable operating conditions that are strongly dependent upon small changes in control input, as is characteristic of the onset of flooding. At the same time, threshold $\Delta$ is scaleable in order to indicate the onset of flooding in a local region (e.g., at onset point 92), before flooding spreads across a particular processing element such as a stripper or a rectifier (e.g., localized flooding region 94), or across more than one different processing element (e.g., runaway flooding region 96). Alternatively, threshold $\Delta$ has a relative rather than absolute form, or the flooding indicator is based on slope or other functional form, rather than threshold $\Delta$ itself.

The present invention has been described with reference to particular embodiments. The terminology used is for the purposes of description, not limitation, and workers skilled in the art will recognize that changes may be made in form and detail without departing from the spirit and scope of the invention.

The invention claimed is:

1. A system comprising:
    a pressure sensor for sensing differential pressure across a vertical height of a distillation column;
    a filter for filtering the differential pressure as a function of frequency to produce a filtered differential signal emphasizing high-frequency components in the differential pressure and suppressing low-frequency components in the differential pressure;
    a processor for generating an indicator function based on the filtered differential pressure signal, wherein the indicator function comprises a standard deviation of the filter output and is indicative of a flooding condition in the distillation column;
    an indicator for indicating onset of the flooding condition in the distillation column based on a change in the indicator function; and
    a controller for controlling the distillation column based on the change in the indicator function, wherein the controller is configured to control a mass transfer rate between liquid and vapor phases within the distillation column to encourage condensation and separation without runaway flooding.

2. The system of claim 1, further comprising packing materials in the distillation column, wherein the pressure sensor is configured for sensing the differential pressure in a frequency range that is responsive to bubble formation and collapse in void regions between the packing materials.

3. The system of claim 2, wherein the change in the indicator function is indicative of a phase inversion between continuous and discontinuous vapor and liquid phases in the void regions between the packing materials.

4. The system of claim 3, further comprising a transmitter configured to house the pressure sensor, the filter, the processor and the indicator.

5. The system of claim 4, wherein the filter is configured for filtering the differential pressure signal by means of a difference filter.

6. The system of claim 4, wherein the pressure sensor is configured for sensing the pressure at a rate of at least 10 Hz and wherein the transmitter is configured for operation on a two-wire control loop having a current of about 20 mA or less.

7. The system of claim 1, wherein the sensor samples the differential pressure at a sampling rate of 10 Hz or higher, corresponding to a Nyquist frequency of about 5 Hz or more, such that the Nyquist frequency is above a frequency of bubble formation along the distillation column.

8. The system of claim 1, wherein the indicator function further comprises a variation of the filtered differential pressure signal.

9. The system of claim 1, wherein the indicator function further comprises a skewness of the filtered differential pressure signal.

10. The system of claim 1, wherein the indicator function further comprises a kurtosis of the filtered differential pressure signal.

11. The system of claim 1, wherein a relative gain of the indicator function is scaled so that the change in the indicator function is indicative of onset of the flooding condition in a local region of the distillation column before runaway flooding spreads across the distillation column.

12. The system of claim 11, wherein the controller is configured to regulate a reboiler duty to increase or decrease a vapor flow rate in the distillation column based on the change in the indicator function.

13. An apparatus comprising:
a sensor configured to sample differential pressure;
means for connecting the sensor across a vertical height of a two-phase liquid and vapor phase counter-current flow distillation column;
means for generating a frequency-filtered signal emphasizing high-frequency components in the differential pressure and suppressing low-frequency components in the differential pressure, such that the frequency-filtered signal is responsive to foaming within the vertical height of the distillation column;
means for generating an indicator function comprising a standard deviation of the frequency-filtered signal, such that the indicator function is indicative of a phase inversion in the two-phase liquid and vapor phase counter-current flow;
means for indicating a flooding condition in the distillation column based on a change in the indicator function; and
means for controlling a mass transfer rate between the liquid and vapor phases within the distillation column based on a change in the indicator function, in order to encourage condensation and separation without runaway flooding.

14. The apparatus of claim 13, wherein means for generating the frequency-filtered signal is responsive to noise signals associated with bubble formation and collapse in the distillation column.

15. The apparatus of claim 14, wherein means for generating the frequency-filtered signal includes a difference filter for generating the frequency-filtered signal.

16. The apparatus of claim 13, wherein means for generating the indicator further utilizes a sampling window of about five minutes or less, and wherein the standard deviation is generated within the sampling window.

17. The apparatus of claim 13, wherein the sensor samples the differential pressure at a sampling rate of about 22.2 Hz or higher, corresponding to a Nyquist frequency of about 11.1 Hz or more.

18. The apparatus of claim 13, wherein the indicator function further comprises a variation of the filtered differential pressure signal.

19. The apparatus of claim 13, wherein the indicator function further comprises a skewness of the filtered differential pressure signal.

20. The apparatus of claim 13, wherein the indicator function further comprises a kurtosis of the filtered differential pressure signal.

21. The apparatus of claim 13, wherein a relative gain of the indicator function is scaled so that the change in the indicator function is indicative of onset of a flooding condition in a local region of the distillation column before runaway flooding spreads across the distillation column.

22. The apparatus of claim 21, wherein means for controlling the mass flow rate comprises means for regulating a reboiler duty to increase or decrease a vapor flow rate in the distillation column based on the change in the indicator function.

23. A transmitter comprising:
a differential pressure sensor;
a housing for the differential pressure sensor, the housing having differential pressure ports configured to connect the differential pressure sensor to a distillation column;
a filter connected to the pressure sensor, the filter configured to generate a filter output emphasizing high-frequency components in the differential pressure and suppressing low-frequency components in the differential pressure;
a processor connected to the filter, the processor configured to generate an indicator function comprising a standard deviation of the filter output, wherein the indicator function is indicative of a flooding condition in the column; and
an interface connected to the processor, the interface configured to indicate onset of the flooding condition based on a change in the indicator function; and
a controller for controlling the distillation column based on the change in the indicator function, wherein the controller is configured to control a mass transfer rate between liquid and vapor phases within the distillation column to encourage condensation and separation without runaway flooding.

24. The transmitter of claim 23, wherein the indicator function further comprises a variation of the filtered differential pressure signal.

25. The transmitter of claim 23, wherein the indicator function further comprises a skewness or kurtosis of the filtered differential pressure signal.

26. The transmitter of claim 23, wherein the differential pressure sensor senses the differential pressure at a sampling rate corresponding to a Nyquist frequency that is above a frequency of bubble formation in the distillation column.

27. The transmitter of claim 23, wherein a relative gain of the indicator function is scaled so that the change in the indicator function indicates onset of a flooding condition in a local region of the distillation column before runaway flooding spreads across the distillation column.

28. The transmitter of claim 27, wherein the controller is configured to regulate a reboiler duty to increase or decrease a vapor flow rate in the distillation column based on the change in the indicator function.

* * * * *